United States Patent [19]
Mkrtchyan

[11] Patent Number: 5,487,636
[45] Date of Patent: Jan. 30, 1996

[54] TIME AND COST EFFICIENT STORAGE FACILITY

[76] Inventor: Mais Mkrtchyan, 614 Salem St., #2, Glendale, Calif. 91203

[21] Appl. No.: 421,431

[22] Filed: Apr. 12, 1995

[51] Int. Cl.⁶ ................................................ B65G 1/04
[52] U.S. Cl. .................... 414/286; 414/253; 414/261; 414/245; 414/277; 414/259
[58] Field of Search ................................. 414/227, 228, 414/233, 234, 231, 232, 252, 253, 241, 242, 255, 256, 257, 259, 245, 260, 261, 262, 264, 266, 273, 277, 279, 281, 282, 927, 928, 286, 929, 799; 364/478

[56] References Cited

U.S. PATENT DOCUMENTS

| | | | |
|---|---|---|---|
| 2,624,470 | 1/1953 | Geist | 414/286 X |
| 4,768,914 | 9/1988 | Sing | 414/286 X |
| 4,923,354 | 5/1990 | Giuliano et al. | 414/286 |
| 5,018,926 | 5/1991 | Sternad | 414/253 |
| 5,120,178 | 6/1992 | Ito | 414/286 X |
| 5,330,306 | 7/1994 | Pemberton et al. | 414/286 |
| 5,437,536 | 8/1995 | Bianca | 414/286 X |

FOREIGN PATENT DOCUMENTS

| | | | |
|---|---|---|---|
| 2435967 | 3/1976 | Germany | 414/279 |
| 2727145 | 12/1978 | Germany | 414/286 |
| 64708 | 3/1994 | Japan | 414/253 |

*Primary Examiner*—Frank E. Werner
*Attorney, Agent, or Firm*—Patent Law & Venture Group; Gene Scott

[57] ABSTRACT

A multi-level storage facility comprising a plurality of vertically stacked storage chambers, each of a size to accommodate an item to be stored, such as a vehicle. Each chamber contains a platform, and all of the chambers are accessible from a common face of the facility. An elevator is mounted so as to move along the common face of the facility to provide access to any one of the chambers. Each of the chambers and the elevator provide a device for engaging one of the platforms in an upper or a lower position. The platform being movable between positions at any time including when the elevator is in motion. With the elevator aligned with any one of the chambers, the platform in the chamber may be exchanged with one on the elevator. The elevator provides a device for acheiving this result, saving the extreme expense of having exchange devices in each and every chamber, or on each platform.

5 Claims, 6 Drawing Sheets

TIME AND COST EFFICIENT STORAGE FACILITY

This application is similar to our previously filed application, Ser. No. 08/110,863, having a filing date of Aug. 24, 1993.

1. Field of the Invention

This invention relates generally to mass storage facilities, and, more particularly, is directed towards a high efficiency automated storage facility providing novel means for handling palletized loads.

2. Background of the Invention

Automated, multi-level storage structures have been designed to more efficiently manage the storing and rapid retrieval of objects such as automobiles, cargo trailers, and the like. Many such prior art devices teach a system whereby movable pallets or platforms are positioned to accept an item to be stored, and then moved by various means such as elevator lifts, and the like, to a final storage destination. The storage destination may be several levels above the loading level, for example.

Examples of such prior art devices are found in U.S. Pat. No. 5,173,027 to Trevisani on Dec. 22, 1992; U.S. Pat. No. 5,024,571 to Shahar et al. on Jun. 18, 1991; U.S. Pat. No. 4,950,117 to Go on Aug. 21, 1990; Japan patent to Yamane, and U.S. Pat. No. 3,680,718 to Miyachi on Aug. 1, 1972. Such prior art systems typically use motorized pallets for moving objects, such as vehicles, on the pallets from place to place within the facility. Other prior art devices use mechanical moving systems built into each floor of the facility for moving the pallets from place to place.

Yamane teaches a system having upper an lower storage means in which a double tiered elevator is positionable so as to swap two pallets simultaneously. But Yamane teaches that each storage space requires a drive means, which is no doubt very costly in a large storage facility. Also, Yamane does not teach that the pallet can be swaped between upper and lower positions in the elevator while the elevator is in motion, which capability provides improved time efficiency, since if the item to be stored is located on the lower level in the elevator, the elevator must be moved several times at the storage location.

Miyachi teaches U-shaped channels and wheel bearing means on the pallets which hold the items for storage, but does not teach means for pallet transfer within the elevator itself.

Such prior art arrangements are certainly effective. On the other hand, such arrangements are extremely costly to manufacture, install, and maintain. For example, when each pallet, or each storage location includes its own motivation means or other complicated gearing arrangement, this adds considerably to the overall cost of such a system. Likewise, when each storage space is equipped with complicated pallet handling and moving mechanisms, each storage space adds considerably to the overall cost of the system. As a result, such systems are costly and have many individual moving mechanisms that will fail from time to time, thus driving up the cost of facility maintanance.

Moreover, a drawback with the prior art systems that use movable pallets, such as disclosed in Shahar et al., is that the transport time required to either store or retrieve an object is relatively long, due mostly to the fact that other pallets, either empty or full, must be moved out of the way to make room for the object pallet. Such systems further require a convenient staging area near the loading area for holding empty pallets. As a result, as a pallet is loaded and sent to its destination, the elevator must deliver that pallet to the proper level, perhaps waiting for other pallets on that level to be shifted so as to make room for the new pallet, then return to the staging area to pick-up an empty pallet, and finally return to the loading area to pick-up the next object. Such a system clearly has significant delays, and therefore requires multiple elevators in order to avoid such delays.

Clearly, then, there is a need for a multi-level parking facility that is more efficient both in its cost of manufacture per storage area and in its operation. Such a needed facility would include relatively inexpensive storage pallets or platforms, and would not require complicated pallet moving mechanisms in each storage area. Such a needed facility would be easily controlled by the most basic computer systems, and would not require full-time parking attendants to operate the facility. Such a system would include the ability to move a pallet between positions in the elevator while the elevator is in motion so as to save time in jockying the elevator to multiple positions at the storage cite for a single delivery or pick-up. The present invention fulfills these needs and provides further related advantages.

SUMMARY OF THE INVENTION

The present invention is a multi-level storage facility comprising a plurality of vertically stacked storage chambers and a plurality of storage platforms. Each chamber contains one of the platforms, and all of the chambers are accessible from a common face of the facility. Each chamber is of a size to accommodate an item to be stored, such as a vehicle. An elevator is mounted so as to move along the common face of the facility to provide access to any one of the chambers. Each of the chambers and the elevator provide a lower storage means for engaging one of the platforms when the platform is empty. Likewise, each of the chambers and the elevator provide an upper storage means for engaging one of the platforms when the item for storage is on the platform. With the elevator aligned with any one of the chambers, the respective lower storage means and upper storage means of the chamber are aligned with the lower storage means and the upper storage means of the elevator, respectively, so that transfers of the platform between the elevator and the chamber may be achieved simultaneously, a time saving feature. The elevator further includes a first transferring means for transferring the platform between the chamber and the elevator. Further, a second transferring means is included for transferring the platform between the lower storage means and the upper storage means of the elevator, a further time saving feature of the invention.

In use, the item to be stored in the facility is loaded onto one of the platforms that is positioned on an upper storage means of the elevator, and then moved to any chamber by the elevator. The loaded platform in the elevator is swapped with the empty platform in the chamber. The loaded platform is transferred into the upper storage means of the chamber, and the empty platform of the chamber is transferred into the lower storage means of the elevator. The empty platform in the elevator may then be transferred to the upper storage means of the elevator in anticipation of repeating the storing sequence. In a similar manner, to retrieve an item from the facility, first an empty platform in the upper storage means of the elevator is transferred to the lower storage means of the elevator, and the elevator is positioned adjacent to the selected target chamber. The loaded chamber platform on the upper storage means of the chamber is transferred to the upper storage means of the elevator, while the empty platform on the lower storage means of the elevator is placed into the lower storage means of the now empty chamber.

The present invention is a multi-level parking facility that is more efficient both in its cost of manufacture per storage unit and in its operation than the prior art systems. The present facility utilizes relatively inexpensive storage platforms, and does not require complicated platform moving mechanisms in each storage chamber. The present invention is easily controlled by readily available computer systems, and does not require full-time parking attendants to operate. Further, the present device minimizes delays caused by managing empty platforms since both empty and full platforms may be handled simultaneously. Thus it is a primary objective of the present invention to provide a storage facility that is cost effective and time efficient. Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
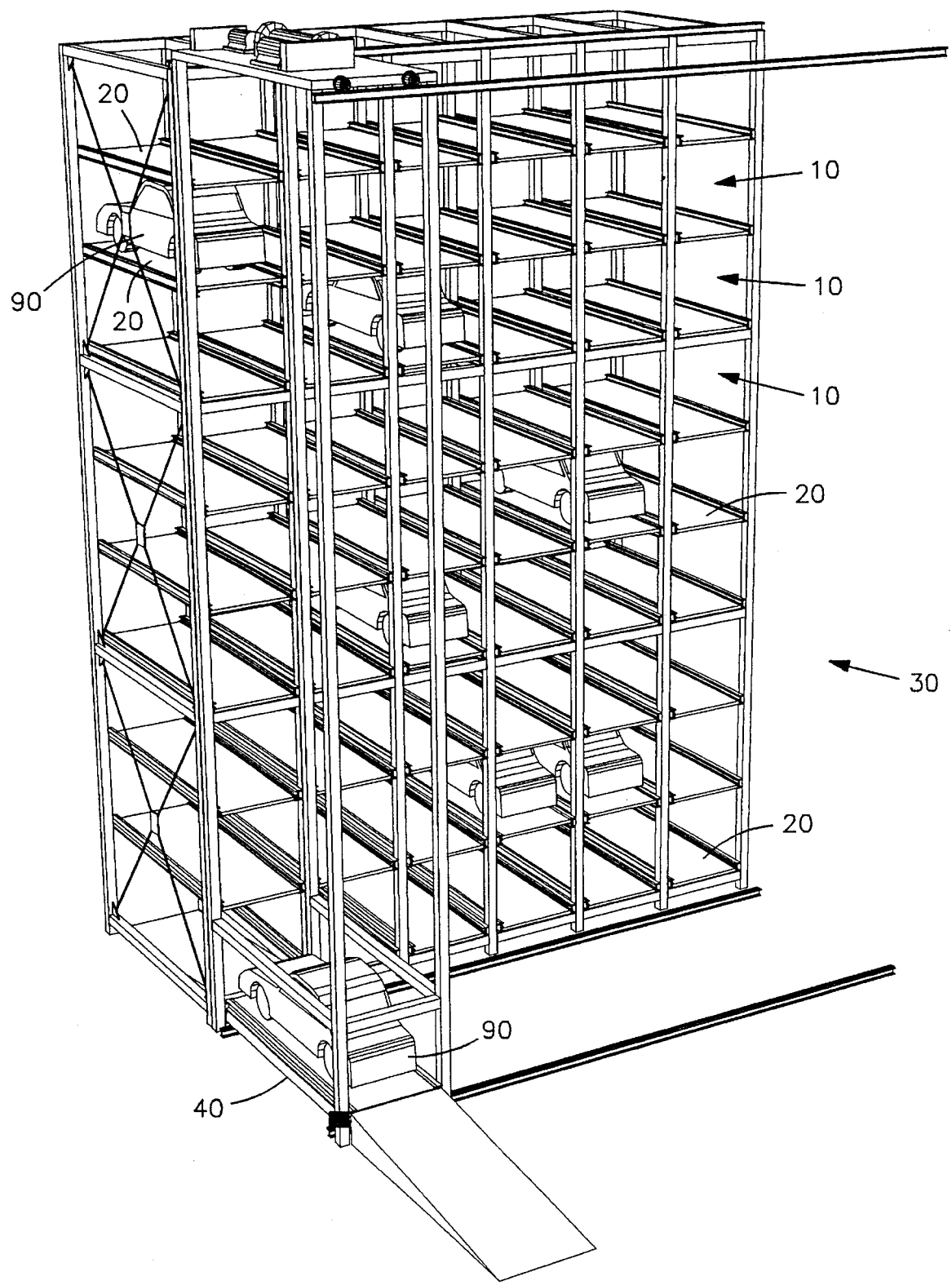
FIG. 1 is a perspective illustration of the invention, illustrating a facility of vertically stacked storage chambers, some of which contain a vehicle to be stored.
Figure 2:
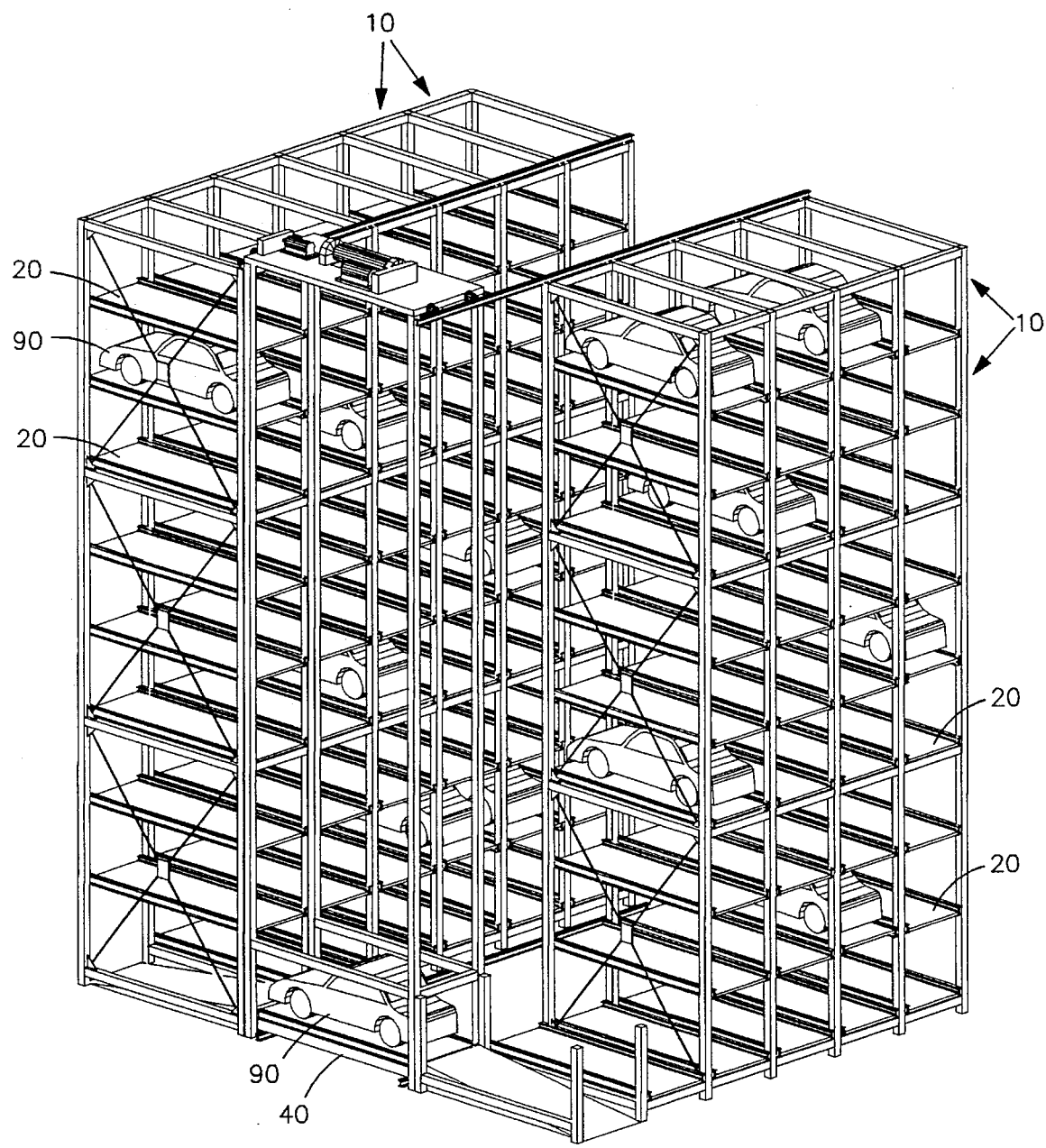
FIG. 2 is a perspective illustration of the invention, illustrating an embodiment that includes two vertically stacked storage chamber facilities sharing a common elevator.

FIGS. 1 and 2 show a multi-level storage facility comprising a plurality of vertically stacked storage chambers 10 and a plurality of storage platforms 20. Each chamber contains one of the platforms 20, and all of the chambers 10 are accessible from a common face 30 of the facility. Each chamber 10 is of a size to accommodate an item 90 to be stored, such as a vehicle. Chambers 10 are not necessarily each of the same size, as some chambers 10 may be larger than other chambers 10 so as to accommodate larger or smaller items 90.

An elevator 40 is mounted so as to move along the common face 30 of the facility to provide access to any one of the chambers 10, In the embodiment of the invention illustrated in FIG. 2, two facilities share a common elevator 40.

Figure 3:
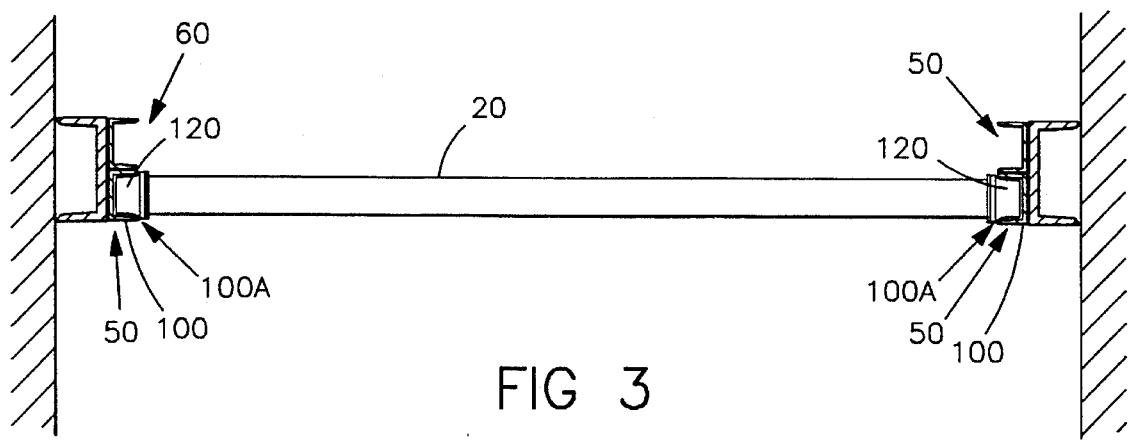
FIG. 3 is a partial front elevational view of the invention, illustrating in more detail an upper storage means, a lower storage means, and a storage platform of the invention.
Figure 4:
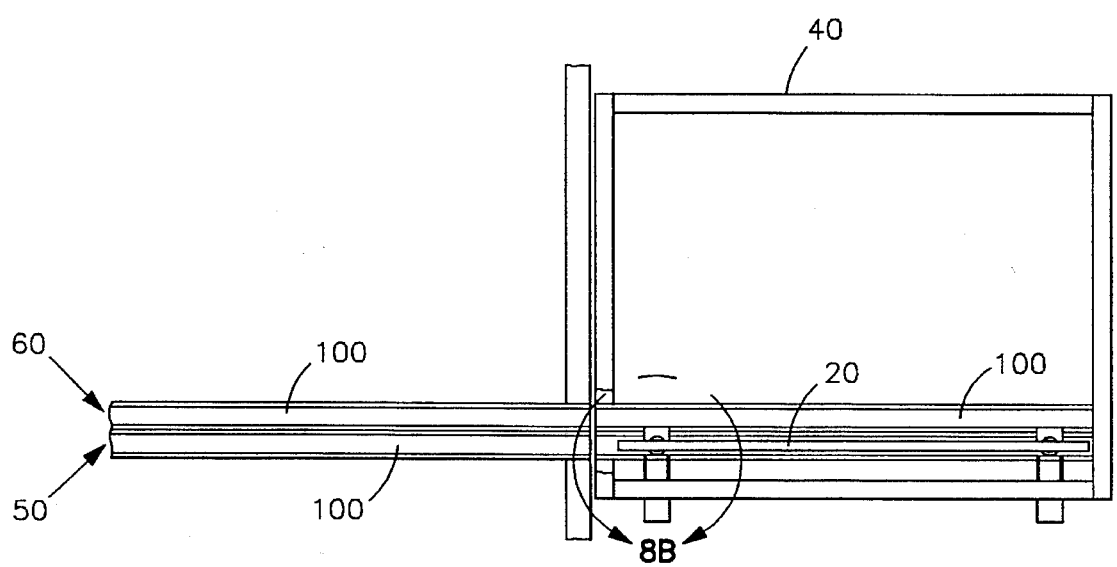
FIG. 4 is a partial left-side elevational view of the invention, illustrating the position of the empty platform when in the elevator.
Figure 5:
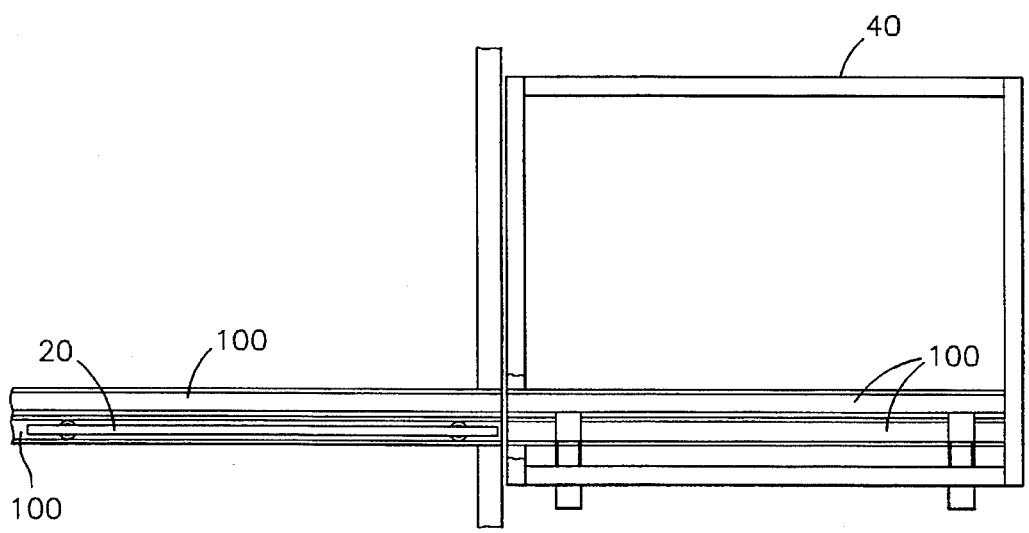
FIG. 5 is a partial left-side elevational view of the invention, illustrating the position of the empty platform in the chamber.
Figure 6:
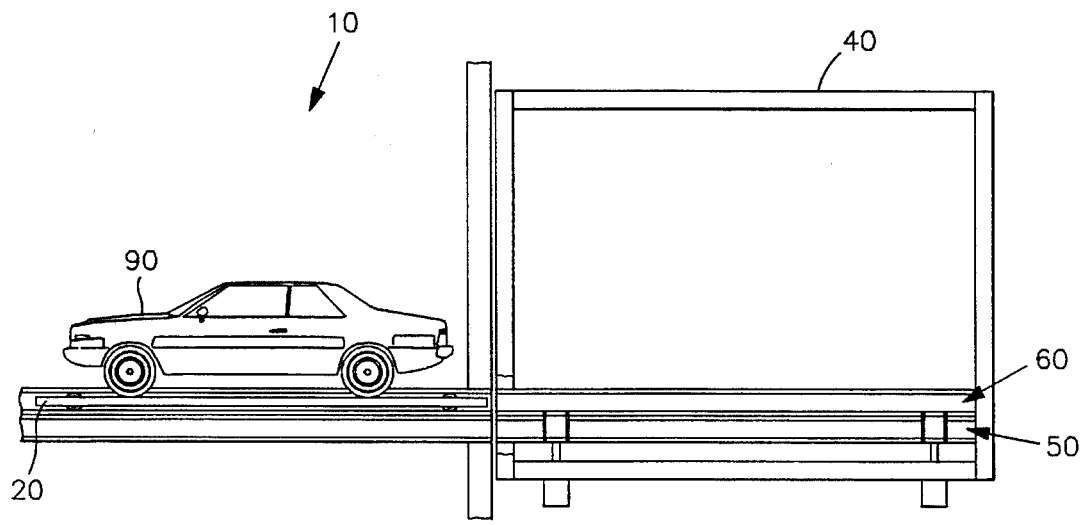
FIG. 6 is a partial left-side elevational view of the invention, illustrating the position of the loaded platform in the chamber.
Figure 7:
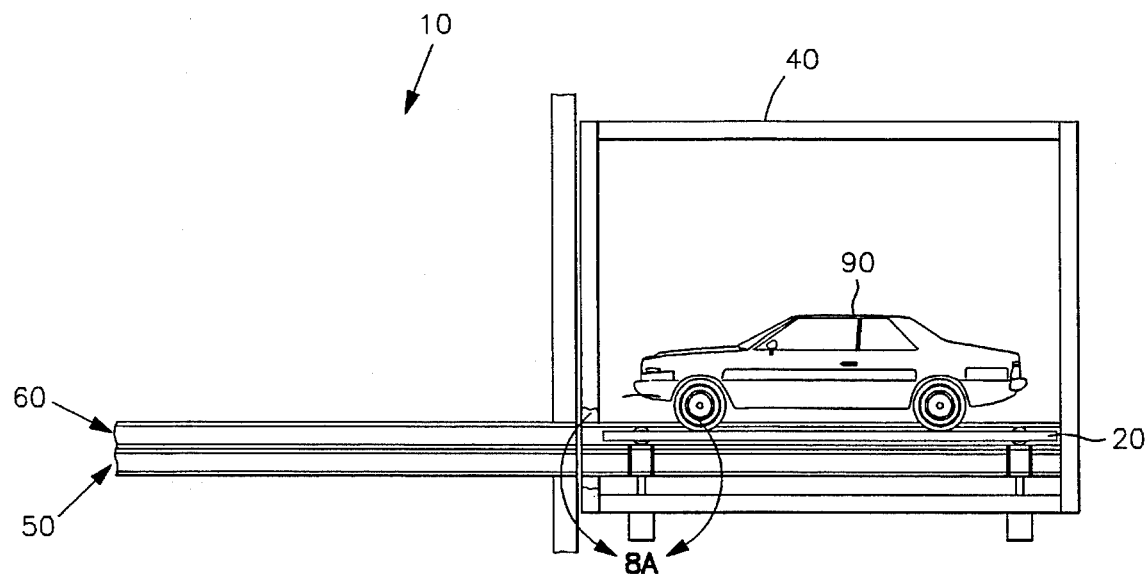
FIG. 7 is a partial left-side elevational view of the invention, illustrating the position of the loaded platform when in the elevator.
Figure 9:
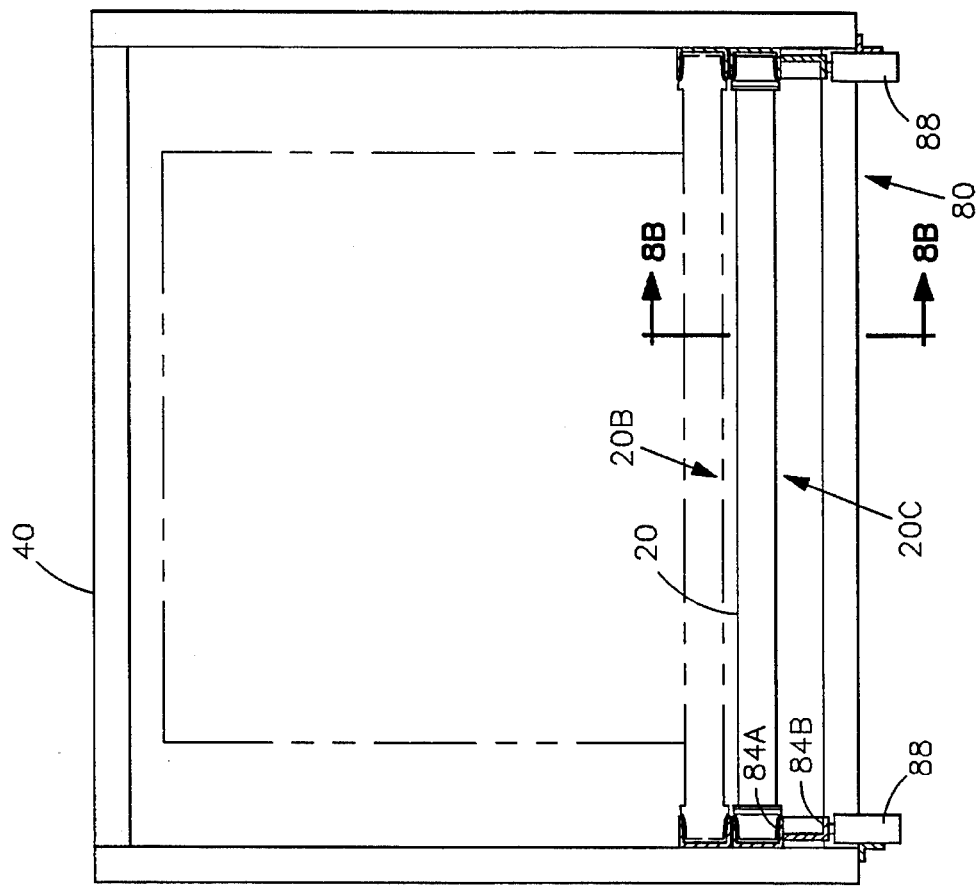
FIG. 9 is a partial front elevational view of the invention, illustrating in more detail the elevator with the platform in the lower storage means thereof.

Each of the chambers 10 and the elevator 40 provide a lower storage means 50 for engaging one of the platforms 20 when the platform 20 is empty (FIG. 3). Likewise, each of the chambers 10 and the elevator 40 provide an upper storage means 60 for engaging one of the platforms 20 when the platform 20 contains the item 90 for storage in the facility. With the elevator 40 is aligned with any one of the chambers 10, the respective upper and the lower storage means 50, 60 of the elevator and one of the chambers are respectively aligned so that transfers of the platforms 20 between the elevator 40 and the chamber 10 may be achieved.

Preferably, the upper storage means 60 and the lower storage means 50 are each a pair of opposing U-shaped channels 100 (FIG. 3 ). The opposing channels 100 are oriented such that the respective open sides 100A are facing each other. Further, each of the platforms 20 includes a plurality of wheels 120 positioned for engaging the U-shaped channels 100. As such, each one of the platforms 20 may be rolled into any one of the upper storage means 60 or the lower storage means 50.

The elevator 40 further includes a first transferring means 70 for transferring one platform 20, or alternately, two platforms 20 simultaneously, between the elevator and any one of the storage chambers 10. The first transferring means 70, preferably includes a horizontally oriented drive belt assembly 71, of construction well known in the art. The drive belt assembly 71 includes belt engagement teeth 72 extending outwardly from a drive belt 73. Each platform 20 includes a linear series of platform engagement teeth 21 extending along one side 20A of the platform 20 on both the top and the bottom of the platform 20 and these teeth are considered a part of first transferring means 70. The platform and the belt engagement teeth 21, 72 respectively, are positioned and adapted for mutual engagement so that as the first transferring means 70 is powered to rotate the drive belt 73, both of the platforms 20 are driven into new preferred selected positions, usually in simultaneous, synchronous exchange. An important and highly novel feature of the present invention is that the first transferring means 70, which includes a prime mover 74 such as an electric motor, is constructed to move from a first position 76, fully enclosed within the elevator, to a second position 77 extending at least partly out of the elevator 40 toward the platform 20 which is intended to be drawn into the elevator 40. The first transferring means 70 may be positioned only on one side of the elevator 40, or one may be positioned on each side of the elevator 40 when loading operations are required for both sides such as shown in FIG. 2. Other platform transfer devices may be employed in the platform transfer function of the present invention, as long as their employment and design are included in the spirit and scope of the appended claims.

Figure 8A:
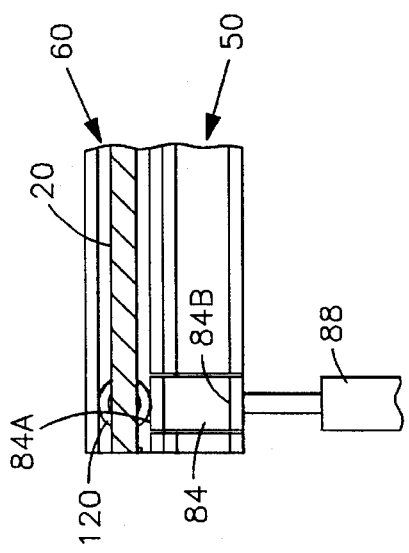
FIG. 8A is a cross-sectional view of the invention, taken generally along lines 8—8 of FIG. 9, illustrating in more detail a second transferring means in an extended position.
Figure 8B:
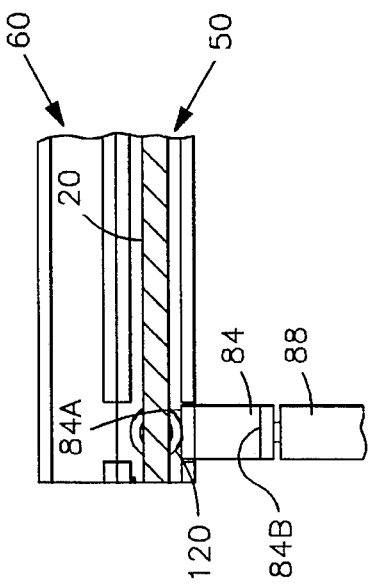
FIG. 8B is a cross-sectional view of the invention, taken generally along lines 8—8 of FIG. 9, illustrating in more detail the second transferring means in a retracted position.
Figure 10:
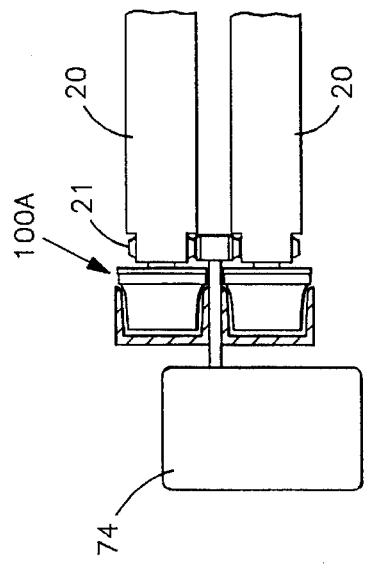
FIG. 10 is a front elevational view of a first transfer means.
Figure 11:
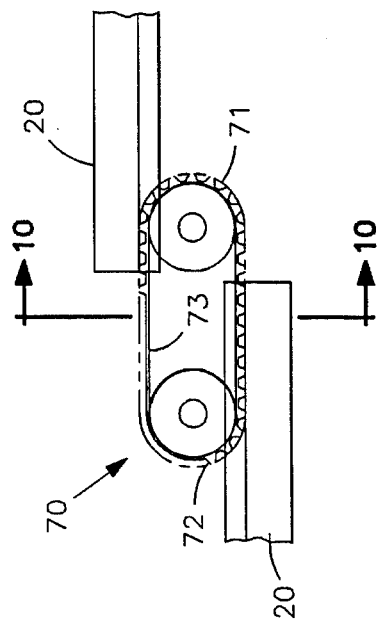
FIG. 11 is a side elevational view of the first transfer means.
Figure 12A:
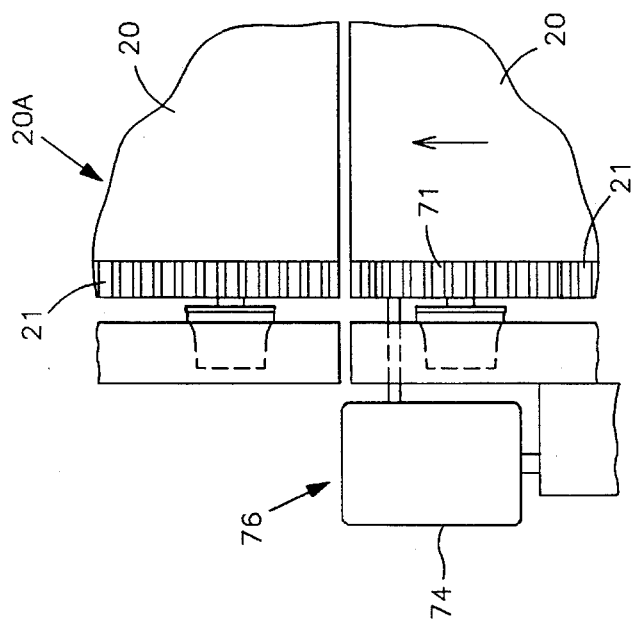
FIG. 12A is a plan view of the first transfer means in a retracted position.
Figure 12B:
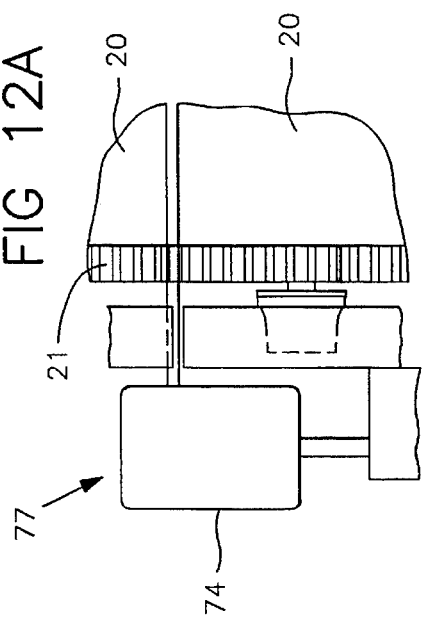
FIG. 12B is a plan view of the first transfer means in an extended position.

Further, a second transferring means 80 is included for transferring one of the platforms 20 between the lower storage means 50 and the upper storage means 60 within the elevator 40 (FIGS. 8A & 8B). The intent is to facilitate such transfer during elevator movements in order to acheive a very high level of efficiency. Such a second transferring means 80 preferably includes, on each side of the elevator 40, a double U-shaped section 84 forming a part of U-shaped channels 100. Each U-shaped section 84 is fixed to a powered means for vertical positioning 88, preferably a hydraulic cylinder, that moves the U-shaped section 84 up or down so as to position a platform in the upper or, alternately, the lower storage means 50, 60 of the elevator 40. The sections 84 provide upper 84A and lower 84B rest means, preferably a flat or alternately slightly concave surface for a wheel to rest upon. Preferably, with platforms having four wheels, all four cylinders 88 are synchronized such that all of the U-shaped sections move at the same time. Further, each section 84 is wide enough to accommodate a wheel 120. As such, a platform 20 is transferred from the upper storage means 60 to the lower storage means 50 of the elevator by moving the platform 20 with the first transferring means 70 until each wheel 120 of the platform 20 is located within one section 84 of the second transferring means 80. Then each cylinder 88 is retracted so that the platform 20 is moved to the lower storage means 50. The reverse procedure is followed to transfer the platform 20 from the lower storage means 50 to the upper storage means 60. Clearly, other such second transferring means 80 could be devised by one skilled in the art without changing the spirit and scope of the present invention.

In use, the item 90 to be stored in the facility is loaded onto one of the platforms 20 that is positioned on the upper storage means 60 of the elevator 40, which then moves to any empty chamber 10. The loaded platform 20 in the elevator 40 is swapped with an empty platform 20 in the chamber 10. The loaded platform 10 is transferred into the upper storage means 60 of the chamber 10, and the empty platform 20 of the chamber 10 is transferred into the lower storage means 50 of the elevator 40, both transfers preferably being simultaneous. The empty platform 20 in the elevator 40 may then be transferred to the upper storage means 60 of the elevator 40 in anticipation of repeating the storing sequence.

In a similar manner, to retrieve an item 90 from the facility, first an empty platform 20 in the upper storage means 60 of the elevator 40 is transferred to the lower storage means 50 within the elevator 40. The elevator 40 is then moved adjacent to the desired chamber 10. The loaded chamber platform 20 on the upper storage means 60 of the chamber 10 is transferred to the upper storage means 60 of the elevator 40, while simultaneously the empty platform 10 on the lower storage means 50 of the elevator 40 is moved into the lower storage means 50 of the now empty chamber 10.

Relatively simple computer control of the facility can be implemented by those skilled in the art, as well, thereby minimizing the need for full-time parking attendants. Such a computer control system (not shown) may include simple card readers or keyboard input means located near the loading area, and control the simple operations of directing the elevator 40 to a particular chamber 10, activating the first transferring means 70 and the second transferring means 80, and keeping track of which chambers 10 are occupied and vacant. Such control systems are well known and therefore not detailed herein.

Clearly, those skilled in the art could readily include wheel stops or detent bumps (not shown) in either the upper storage means 60 or the lower storage means 50 to enable proper positioning of the platform 20. Likewise, the elevator 40 could easily be fitted with positioning means (not shown) for positioning the elevator with a desired degree of accuracy at the chambers 10.

Thus, while the invention has been described with reference to a preferred embodiment, it is to be clearly understood by those skilled in the art that the invention is not limited thereto. Rather, the scope of the invention is to be interpreted only in conjunction with the appended claims.

What is claimed is:

1. A multilevel storage facility comprising:

a plurality of vertically stacked storage chambers and a plurality of storage platforms, each of the chambers containing one of the platforms, all of the chambers being accessible from a common face of the facility;

an elevator, mounted to move along the common face of the facility for providing access to any one of the chambers;

each of the chambers and the elevator providing a lower storage means for engaging one of the platforms when said platform is empty, and an upper storage means for engaging one of the platforms, when said platform contains an item for storage thereon, each of the platforms including a plurality of wheels positioned for engaging the upper storage means, and alternately, the lower storage means, such that with the elevator aligned with any one of the chambers, the respective elevator and chamber lower storage means and upper storage means are respectively aligned so that platform transfers are enabled therebetween;

the elevator further including a first transferring means for transferring one of the platforms between one of the chambers and the elevator, and a second transferring means for transferring one of the platforms between the elevator lower storage means and the elevator upper storage means; the second transferring means including a plurality of U-shaped sections, each providing an upper, and a lower rest surface for supporting one of the wheels of one of the platforms, the U-shaped sections including means for vertical positioning thereof, such that with the wheels of one of the platforms positioned on the lower rest surfaces of the U-shaped sections respectively, the platform is vertically positionable within the upper, or alternately, the lower storage means of the elevator by vertical adjustment of the position of the U-shaped sections in synchronized motion, and with the lower rest surfaces positioned in the elevator lower storage means, the upper rest surfaces are positioned in the elevator upper storage means, the exchange of platform positions being enabled during elevator movement;

such that an item to be stored in the facility is loaded onto one of the platforms positioned on the elevator upper storage means, and then moved to any empty chamber, swapping the loaded platform in the elevator with the empty platform in the chamber, the loaded platform being transferred into the chamber upper storage means, the empty chamber platform being transferred into the elevator lower storage means, the empty platform then being transferred to the elevator upper storage means in anticipation of repeating a storing sequence; and to retrieve an item from the facility, first an empty one of the platforms in the elevator upper storage means is transferred to the elevator lower storage means, the elevator is positioned adjacent to a target one of the chambers, and the loaded chamber platform on the chamber upper storage means is transferred to the elevator upper storage means, while the empty elevator platform on the elevator lower storage means is placed into the chamber lower storage means.

2. The multilevel storage facility of claim 1 wherein the upper storage means and the lower storage means are each a pair of opposing U-shaped channels, each of the channels having an open side, the opposing channels being oriented such that the respective open sides are facing, and further, the wheels of each of the platforms are positionable on the U-shaped channels, such that one of the platforms may be rolled into any one of the upper storage means or any one of the lower storage means.

3. The multilevel storage facility of claim 2 wherein the U-shaped channels are each engaged by a hydraulic cylinder for moving each U-shaped channel.

4. The multilevel storage facitlity of claim 1 wherein the first transferring means includes a horizontally oriented drive belt assembly, including drive belt engagement teeth extending away from the drive belt, and each platform includes a linear series of platform engagement teeth extending along a side of the platform on both a top and a bottom of the platform, the platform and the belt engagement teeth respectively being positioned and adapted for mutual engagement so that as the drive belt assembly rotates, the platforms are driven simultaneously for exchange between the elevator and the chamber.

5. The multilevel storage facility of claim 4 wherein the drive belt assembly includes a prime mover adapted for lateral position adjustment between a first position fully enclosed within the elevator, and a second position extending from the elevator so as to engage one of the platforms positioned within one of the chambers.

\* \* \* \* \*